United States Patent
Kreulen et al.

(10) Patent No.: US 6,829,734 B1
(45) Date of Patent: Dec. 7, 2004

(54) METHOD FOR DISCOVERING PROBLEM RESOLUTIONS IN A FREE FORM COMPUTER HELPDESK DATA SET

(75) Inventors: Jeffrey Thomas Kreulen, San Jose, CA (US); William Scott Spangler, San Martin, CA (US); Hovey Ramond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,859

(22) Filed: Apr. 4, 2000

(51) Int. Cl.[7] .............................................. G06F 11/00
(52) U.S. Cl. ........................ 714/46; 714/57; 707/7; 379/9.02; 379/9.03; 379/9.04
(58) Field of Search ................... 714/46, 57; 707/7; 379/9.02–9.04

(56) References Cited

U.S. PATENT DOCUMENTS

| | | | |
|---|---|---|---|
| 5,107,499 A | | 4/1992 | Lirov et al. |
| 5,237,518 A | | 8/1993 | Sztipanovits et al. |
| 5,239,547 A | | 8/1993 | Tomiyama et al. |
| 5,463,768 A | * | 10/1995 | Cuddihy et al. ............... 714/37 |
| 5,548,714 A | | 8/1996 | Becker |
| 5,666,481 A | * | 9/1997 | Lewis ............................ 714/4 |
| 5,768,501 A | * | 6/1998 | Lewis .......................... 714/25 |
| 5,857,179 A | * | 1/1999 | Vaithyanathan et al. ....... 707/2 |
| 5,862,223 A | | 1/1999 | Walker et al. |
| 5,864,855 A | * | 1/1999 | Ruocco et al. ................ 707/10 |
| 5,903,877 A | | 5/1999 | Berkowitz et al. |
| 6,000,828 A | | 12/1999 | Leet |
| 6,032,184 A | * | 2/2000 | Cogger et al. ................. 705/8 |
| 6,076,083 A | * | 6/2000 | Baker .......................... 706/52 |
| 6,182,059 B1 | * | 1/2001 | Angotti et al. ................ 706/45 |
| 6,249,571 B1 | * | 6/2001 | Rojas .................... 379/112.01 |
| 6,377,949 B1 | * | 4/2002 | Gilmour ...................... 707/10 |
| 6,424,971 B1 | * | 7/2002 | Kreulen et al. ............. 707/101 |
| 6,654,742 B1 | * | 11/2003 | Kobayashi et al. ............ 707/7 |
| 6,681,224 B2 | * | 1/2004 | Namba .......................... 707/7 |

* cited by examiner

*Primary Examiner*—Robert Beausoliel
*Assistant Examiner*—Michael Maskulinski
(74) *Attorney, Agent, or Firm*—McGinn & Gibb, PLLC; Marc McCabe, Esq.

(57) ABSTRACT

A method and structure for discovering problem resolution in a helpdesk data set of problem tickets is based on using an enumerated set of phrases that have been identified as indicating diagnosis, instruction, or corrective action. A count of these phrases is then obtained and used along with any accompanying structured information to score each problem ticket. The tickets are then sorted so that the most useful problem tickets appear first.

28 Claims, 2 Drawing Sheets

METHOD FOR DISCOVERING PROBLEM RESOLUTIONS IN A FREE FORM COMPUTER HELPDESK DATA SET

BACKGROUND OF THE INVENTION

1. Field of the Invention

The present invention generally relates to helpdesk data sets and more particularly to a method and system for identifying the most useful problem tickets for knowledge authoring from within helpdesk data sets.

2. Description of the Related Art

Support for consumer and commercial products is often provided telephonically. In such situations, an operator (often referred to as a "helpdesk" operator) receives a telephone call with a problem. The telephone operator assigns each problem a specific identification code and records the user's problem (and the help advice provided) in a computerized file. In such a system, if the user calls back, other helpdesk operators can retrieve the computerized file using the specific identification code. This prevents the user from having to wait to speak with a specific helpdesk operator. Additionally, this system provides a helpdesk data set of problems and solutions which other helpdesk operators can access when offering potential solutions to users.

Free form computer helpdesk data sets consist primarily of short text descriptions, composed by the helpdesk operator for the purpose of summarizing what problem a user had and what was done by the helpdesk operator to solve that problem. A typical text document (known as a problem ticket) from this data consists of a series of exchanges between an end user and an expert helpdesk advisor.

For example, one problem ticket may read as follows: "1836853 User calling in with WORD BASIC error when opening files in word. Had user delete NORMAL.DOT and had the user reenter Word, the user was fine at that point. 00:04:17 ducar May 2:07:05:656P". This problem ticket begins with the unique identification number, which is followed by a brief identification of the user's problem, the solution offered, the helpdesk operators name or identification symbol, and a date and time stamp.

Problem tickets may include only a single symptom and resolution pair, as in the above example, or the problem tickets may span multiple questions, symptoms, answers, attempted fixes, and resolutions, all pertaining to the same basic issue. Problem tickets are opened when the user makes the first call to the helpdesk and closed when all user problems documented in the first call are finally resolved in some way. Helpdesk operators enter problem tickets directly into the database. Spelling, grammar and punctuation are inconsistent. The style is terse and the vocabulary very specialized. Therefore, the raw contents of the helpdesk data set are not very useful for addressing future problems because so many problem tickets have little or no useful content.

SUMMARY OF THE INVENTION

It is, therefore, an object of the present invention to provide a structure and method for discovering problem resolutions in a helpdesk data set of problem tickets comprising counting diagnostic phrases in each of the problem tickets, counting corrective actions in each of the problem tickets, counting instructive phrases in each of the problem tickets, counting matching structured fields in each of the problem tickets, and ranking each of the problem tickets based on a total of the diagnostic phrases, corrective actions, instructive phrases, and the matching structured fields for each of the problem tickets.

The diagnostic phrases indicate is one which indicates that the helpdesk operator or the user took some action to gather more information about the cause of the user's problem. The diagnostic phrases include, "tried to", "attempted to", "looks like", "caused by", "it worked", "it would not", "it continues to", "it stops", "it did not", "it died", and "it is frozen". The corrective action comprises at least one verb commonly used in the description of the solution to the user's problem. The corrective actions include, "disabled", "edited", "deleted", "changed", "booted", "adjusted", "selected", "assigned", "modified", "informed", "established", "attached", "removed", "exported", "assisted", "checked", "found", "suggested", and "determined".

The instructive phrase comprises a phrase commonly used by helpdesk operators when beginning an explanation of a cause of the problem and/or the solution to the problem. The instructive phrases include, "told him", "told her", "told client", "told customer", "told cust", "told user", "told the client", "told the user", "had client", "had user", "had him", "had customer", "had the client", "had the user", "had the customer", "had cust", and "recommended". The matching structured fields are indicative of problem resolution usability.

A further embodiment of the invention is a method for discovering problem resolutions in a helpdesk data set of problem tickets comprising mining the problem tickets for words that indicate a problem was resolved, and ranking the problem tickets based on a number of the words that occur within each of the problem tickets.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
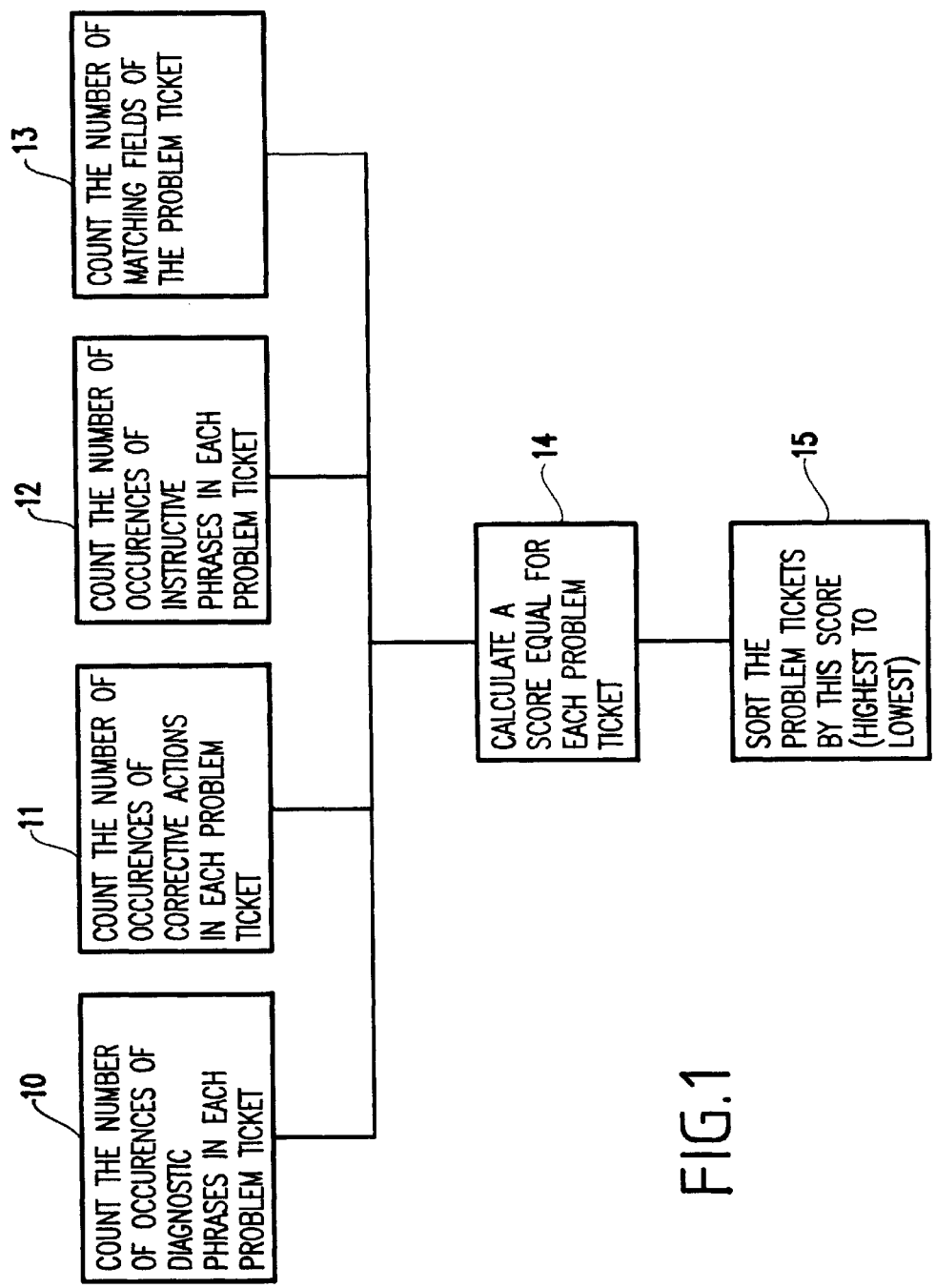
FIG. 1 is a flow diagram illustrating a preferred method of the invention.

The invention overcomes the foregoing problems by mining helpdesk data sets for "problem resolution nuggets". In other words, the invention finds those problem tickets that describe both the symptoms of a problem and how the helpdesk operator solved that problem. Such problem resolution nuggets can then be utilized to create solution documents to put on a web site, or to create automated knowledge bases that can diagnose the user's problem automatically and suggest a corrective action. In either case, it is possible that future users having the same or similar problem will not require the assistance of a helpdesk operator, but instead may be able to repair the problem themselves in less time, thus reducing overall service costs.

Unfortunately many, if not most, of the problem tickets recorded in the typical helpdesk data set provide little or no problem resolution information. Discovering the ones that do is a tedious and time-consuming task for a human expert. The invention makes this task much easier by sorting the problem tickets of interest according to how likely they are to contain problem resolutions.

Given a set of problem tickets, the invention discovers those tickets that are most likely to contain problem resolutions by counting the number of occurrences of diagnostic phrases, corrective actions, and instructive phrases in each problem ticket, counting the number of matching structured fields (i.e., not free form text) of the problem ticket that indicate usability for problem resolution, calculating a score equal to a linear combination of the number of diagnostic phrases, corrective actions, instructive phrases, and matching structured fields, and sorting the problem tickets by this score (i.e., highest to lowest). Definitions of diagnostic phrase, corrective action, and instructive phrase are discussed more fully below.

The invention can be implemented as a computer program, for example written in the Java programming language and executed with the Java virtual machine. The text of each problem ticket is searched (e.g., using the Java String.indexOf method) and each time any of the above strings is found (ignoring case), a score counter for this problem ticket is incremented. The problem tickets having the highest score will be utilized to create a solution data base.

The following describes how each step in the solution process is addressed. This embodiment describes an English language solution, but as would be known by one ordinarily skilled in the art given this disclosure, this embodiment could be generalized to other languages in an analogous way. Further, while specific examples of the different phrases are given below, as would be known by one ordinarily skilled in the art given this disclosure, any similar phrases can be utilized and the invention is not limited to the exemplary phrases provided below.

A diagnostic phrase is one which indicates that the helpdesk operator or the user took some action to gather more information about the cause of the user's problem. Examples of diagnostic phrases include, but are not limited to: "tried to", "attempted to", "looks like", "caused by", "it worked", "it would not", "it continues to", "it stops", "it did not", "it died", and "it is frozen". For this method to work effectively it is not necessary to enumerate all such phrases, but merely to identify the most commonly occurring examples by inspection of typical problem tickets that have diagnostic value.

A corrective action is a verb commonly used in the description of the solution to the user's problem. For example, corrective actions can include, but are not limited to: "disabled", "edited", "deleted", "changed", "booted", "adjusted", "selected", "assigned", "modified", "informed", "established", "attached", "removed", "exported", "assisted", "checked", "found", "suggested", and "determined".

An instructive phrase is a phrase commonly used by helpdesk operators when beginning an explanation of the cause of the problem and/or the solution to the problem. For example instructive phrases can include, but are not limited to: "told him", "told her", "told client", "told customer", "told cust", "told user", "told the client", "told the user", "had client", "had user", "had him", "had customer", "had the client", "had the user", "had the customer", "had cust", and "recommended".

Many software programs utilized by helpdesk operators include structured fields for standard information. For example, common structured fields are used for the user's name, telephone number, address, and company, the type of hardware and software owned by the user, the general nature of the problem (e.g., not working, working slowly, outputting and unpredictable results, etc.)

Some field (or fields) of the structured section of the problem ticket information may be identified as indicative of problem resolution usability. If the value(s) of the field(s) match some preset condition(s) then the score counter is incremented. An example of a preset condition that would cause the score counter to increment is, "problem type= HARDWARE" as opposed to "problem type=REQUEST FOR INFO".

FIG. 1 is a flowchart illustration of one embodiment of the invention. More specifically, in item 10, the invention counts of the number of occurrences of diagnostic phrases in each problem ticket. In item 11, the invention counts of the number of occurrences of corrective actions in each problem ticket. In item 12, the invention counts of the number of occurrences of instructive phrases in each problem ticket. In item 13, the invention counts of the number of occurrences of matching fields in each problem ticket. Then, the invention calculates a score for each problem ticket based upon a total of the diagnostic phrases, corrective actions, instructive phrases and matching structural fields, as shown in item 14. Finally, the invention sorts the problem tickets by their score (from highest to lowest), as shown in item 15.

The higher score indicates greater usefulness because the more often that diagnostic phrases, corrective actions, and/or instructive phrases occur, the more likely it is that the problem ticket has content relevant to a diagnostic knowledge base or solution web page. Then, the most useful problem tickets can be analyzed by a human operator or automated program to prepare a concise problem/resolution data base, which can be posted on a web site for users and/or provided as a resource for helpdesk operators. Thus, the invention acts as a filter to highlight most of the problem tickets which do have diagnostic or corrective information. The remaining problem tickets probably have little useful content.

As would be known by one ordinarily skilled in the art given this disclosure, the highest scoring problem tickets can be automatically or manually sorted into logical classifications to allow a user or helpdesk operator to topically locate a solution to a problem. Such a classification process would be very time and resource intensive using conventional systems because all problem tickets would be involved in the sort/classification. The invention makes best possible use of limited (human) knowledge authoring resources by focusing the authors attention on exactly those problem tickets most likely to contain useful content.

Figure 2:
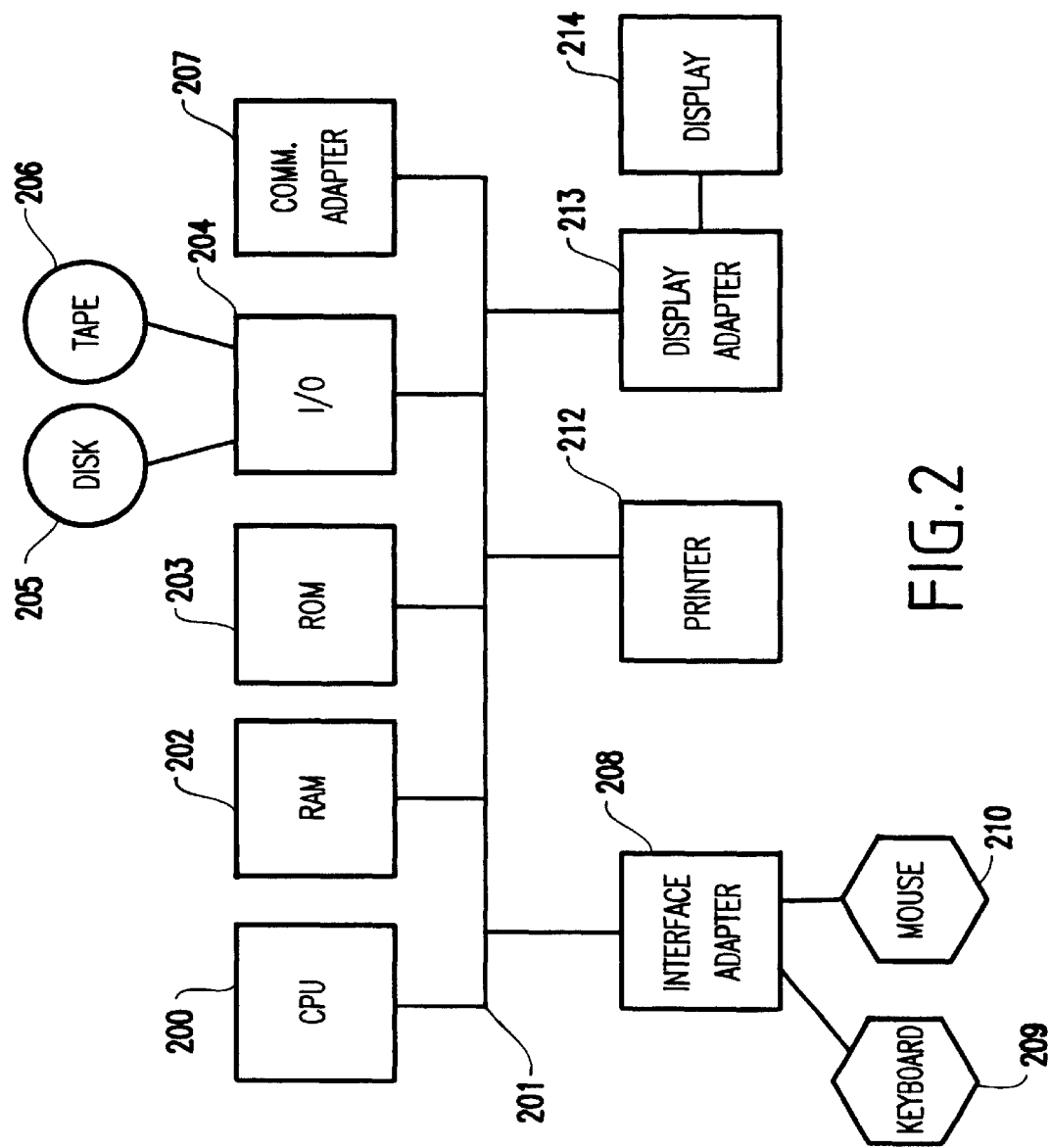
FIG. 2 is a schematic diagram of a hardware embodiment of the invention.

The invention can be embodied in any number of different types of systems and executed in any number of different ways, as would be known by one ordinarily skilled in the art. For example, as illustrated in FIG. 2, a typical hardware configuration of an information handling/computer system in accordance with the invention preferably has at least one processor or central processing unit (CPU) 200. The CPU 200 is interconnected via a system bus 201 to a random access memory (RAM) 202, read-only memory (ROM) 203, input/output (I/O) adapter 204 (for connecting peripheral devices such as disk units 205 and tape drives 206 to the bus 201), communication adapter 207 (for connecting an information handling system to a data processing network) user interface adapter 208 (for connecting a keyboard 209, microphone 210, mouse 211, speaker 212 and/or other user interface device to the bus 201), and display adapter 213 (for connecting the bus 201 to a display device 214).

The invention could be implemented using the structure shown in FIG. 2 by including the inventive method within a computer program stored on the storage device 205. Such a computer program would act on information supplied through the interface units 209, 210 or through the network connection 207 to count the diagnostic phrases, corrective actions, instructive phrases, matching fields, etc. The system would then automatically produce the final desired product (e.g., ranking of problem tickets based on their score) on the display 214 connected with a display adapter 213, through the printer 212, or back to the network 207.

In another embodiment, the score for each problem ticket is a single number (e.g., total of all diagnostic phrases, corrective actions, instructive phrases, matching fields, etc.) that represents how useful the problem ticket is for problem resolution. Again, the higher score indicates greater usefulness because the more often that diagnostic phrases, corrective actions, and/or instructive phrases occur, the more likely it is that the problem ticket will be useful.

In another embodiment, certain phrases (e.g., instructive phrases) are emphasized (e.g., given double the score quantity) over other variables (e.g., diagnostic phrases or corrective actions). However, the invention is not limited to this structure and, as would be known by one ordinarily skilled in the art given this disclosure, other linear combinations may be used for different datasets and knowledge acquisition requirements. For example, in some situations, certain variables (e.g., structure fields) can be ignored.

In a more concrete example, the score for each problem ticket can be calculated using the following Java method:
public static int scoreText(String ss) {
  String s=ss.toLowerCase( );
  int result=0;
  for (int i=0; i<correctiveActions.length; i++)
    if (s.indexOf(correctiveActions[i])>−1)result++;
  for (int i=0; i<instructions.length; i++)
    if (s.indexOf(instructions[i])>−1) result=result+2;
  for (int i=0; i<diagnosticActions.length;i++)
    if (s.indexOf(diagnosticActions[i])>−I) result=result+ 1;
  return(result);

After creating an array of scores corresponding to the set of problem tickets, an ordering of scores from highest to lowest is created (e.g., using the Quick Sort algorithm as documented in "Numerical Recipes in C", by W.H. Press, et al.

Past approaches to automated knowledge acquisition have focused on structuring the user input so that a computer can identify the key elements of the problem ticket. Such approaches put an undo burden on file helpdesk operators. To the contrary, the invention does not require additional work on the helpdesk operation side during the input phase.

Therefore, the invention is applicable to free-form computer helpdesk data sets that have low or no structural fields. The invention provides an automated system for ranking problem tickets.

The invention overcomes the problems of conventional systems by mining helpdesk data sets for "problem resolution nuggets". In other words, the invention finds those problem tickets that describe both the symptoms of a problem and how the helpdesk operator solved that problem. Such problem resolution nuggets can then be utilized to create solution documents to put on a web site, or to create automated knowledge bases that can diagnose the user's problem automatically and suggest a corrective action. In either case, it is possible that future users having the same or similar problem will not require the assistance of a helpdesk operator, but instead may be able to repair the problem themselves in less time, thus reducing overall service costs.

While the invention has been described in terms of preferred embodiments, those skilled in the art will recognize that the invention can be practiced with modification within the spirit and scope of the appended claims.

What is claimed is:

1. A method for discovering problem resolutions in a helpdesk data set of problem tickets comprising:
   topically mining problem tickets from said helpdesk data set;
   counting diagnostic phrases in each of said problem tickets;
   counting corrective actions in each of said problem tickets;
   counting instructive phrases in each of said problem tickets;
   counting matching structured fields in each of said problem tickets; and
   ranking the ability of said problem tickets to resolve problems based on a total of said diagnostic phrases, said corrective actions, said instructive phrases, and said matching, structured fields for each of said problem tickets.

2. The method in claim 1, wherein said diagnostic phrase is one which indicates that a helpdesk operator or a user took some action to gather more information about a cause of said user's problem.

3. The method in claim 2, wherein said diagnostic phrases comprise: "tried to", "attempted to", "looks like", "caused by", "it worked", "it would not", "it continues to", "it stops", "it did not", "it died", and "it is frozen".

4. The method in claim 1, wherein said corrective action comprises at least one verb commonly used in a description of a solution to a user's problem.

5. The method in claim 4, wherein said corrective actions comprise: "disabled", "edited", "deleted", "changed", "booted", "adjusted", "selected", "assigned", "modified", "informed", "established", "attached", "a removed", "exported", "assisted", "checked", "found", "suggested", and "determined".

6. The method in claim 1, wherein said instructive phrase comprises a phrase commonly used by helpdesk operators when beginning an explanation of a cause of a problem and/or a solution to said problem.

7. The method in claim 6, wherein said instructive phrases comprise:"told him", "told her", "told client", "told customer", "told cust", "told user", "told the client", "told the user", "had client", "had user", "had him", "had customer", "had the client", "had the user", "had the customer", "had cust", and "recommended".

8. The method in claim 1, wherein said matching structured fields are indicative of problem resolution usability.

9. A method for discovering problem resolutions in a helpdesk data set comprising:
   topically mining problem tickets from said helpdesk data set;
   mining said problem tickets for words that indicate a problem was resolved; and
   ranking the ability of said problem tickets to solve problems based on a number of diagnostic phrases, corrective actions, instructive phrases, and matching structured fields that occur within each of said problem tickets.

10. The method in claim 9, wherein said ins comprises:
counting diagnostic phrases in each of said problem tickets;
counting corrective actions in each of said problem tickets;
counting instructive phrases in each of said problem tickets; and
counting matching structured fields in each of said problem tickets.

11. The method in claim 10, wherein said ranking is based on a total of said diagnostic phrases, said corrective actions, said instructive phrases, and said matching structured fields for each of said problem tickets.

12. The method in claim 10, wherein said diagnostic phrase is one which indicates that a helpdesk operator or a user took some action to gather more information about a cause of said user's problem.

13. The method in claim 12, wherein said diagnostic phrases comprise: "tried to", "attempted to", "looks like", "caused by", "it worked", "it would not", "it continues to", "it stops", "it did not", "it died", and "it is frozen".

14. The method in claim 10, wherein said corrective action comprises at least one verb commonly used in a description of a solution to a user's problem.

15. The method in claim 14, wherein said corrective actions comprise: "disabled", "edited", "deleted", "changed", "booted", "adjusted", "selected", "assigned", "modified", "informed", "established", "attached", "removed", "exported", "assisted", "checked", "found", "suggested", and "determined".

16. The method in claim 10, wherein said instructive phrase comprises a phrase commonly used by helpdesk operators when beginning an explanation of a cause of a problem and/or a solution to said problem.

17. The method in claim 16, wherein said instructive phrases comprise: "told him", "told her", "told client", "told customer", "told cust", "told user", "told the client", "told the user", "had client", "had user", "had him", "had customer", "had the client", "had the user", "had the customer", "had cust", and "recommended".

18. The method in claim 10, wherein said matching structured fields are indicative of problem resolution usability.

19. A program storage device readable by machine, tangibly embodying a program of instructions executable by the machine to perform a method for discovering problem resolutions in a helpdesk data set, said method comprising:
topically mining problem tickets from said helpdesk data set;.
mining said problem tickets for words that indicate a problem was resolved; and
ranking the ability of said problem tickets to solve problems based on a number of diagnostic phrases, corrective actions, instructive phrases, and matching structured fields that occur within each of said problem tickets.

20. The program storage device in claim 19, wherein said mining comprises:
counting diagnostic phrases in each of said problem tickets;
counting corrective actions in each of said problem tickets;
counting instructive phrases in each of said problem tickets; and
counting matching structured fields in each of said problem tickets.

21. The program storage device in claim 20, wherein said ranking is based on a total of said diagnostic phrases, said corrective actions, said instructive phrases, and said matching structured fields for each of said problem tickets.

22. The program storage device in claim 20, wherein said diagnostic phrase is one which indicates that a helpdesk operator or a user took some action to gather more information about a cause of said user's problem.

23. The program storage device in claim 22, wherein said diagnostic phrases comprise: "tried to", "attempted to", "looks like", "caused by", "it worked", "it would not", "it continues to", "it stops", "it did not", "it died", and "it is frozen".

24. The program storage device in claim 20, wherein said corrective action comprises at least one verb commonly used in a description of a solution to a user's problem.

25. The program storage device in claim 24, wherein said corrective actions comprise: "disabled", "edited", "deleted", "changed", "booted", "adjusted", "selected", "assigned", "modified", "informed", "established", "attached", "removed", "exported", "assisted", "checked", "found", "suggested", and "determined".

26. The program storage device readable by machine, in claim 20, wherein said instructive phrase comprises a phrase commonly used by helpdesk operators when beginning an explanation of a cause of a problem and/or a solution to said problem.

27. The program storage device in claim 26, wherein said instructive phases comprise: "told him", "told her", "told client", "told customer", "told cust", "told user", "told the client", "told the user", "had client", "had user", "had him", "had customer", "had the client", "had the user", "had the customer", "had cust", and "recommended".

28. The program storage device in claim 20, wherein said matching structured fields are indicative of problem resolution usability.

* * * * *